(12) United States Patent
Nishimura et al.

(10) Patent No.: US 9,533,392 B2
(45) Date of Patent: Jan. 3, 2017

(54) MACHINE TOOL HAVING A ROTARY TABLE

(71) Applicant: FANUC Corporation, Yamanashi (JP)

(72) Inventors: Takuma Nishimura, Yamanashi (JP); Naoki Sato, Yamanashi (JP); Hiroki Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 17 days.

(21) Appl. No.: 14/739,375

(22) Filed: Jun. 15, 2015

(65) Prior Publication Data

US 2015/0360337 A1     Dec. 17, 2015

(30) Foreign Application Priority Data

Jun. 16, 2014  (JP) .................. 2014-123675

(51) Int. Cl.
*B23Q 1/64* (2006.01)
*B23Q 11/00* (2006.01)
*B23Q 17/00* (2006.01)
*G05B 19/00* (2006.01)

(52) U.S. Cl.
CPC ........... *B23Q 11/0092* (2013.01); *B23Q 17/00* (2013.01); *G05B 19/00* (2013.01); *B23Q 2220/004* (2013.01)

(58) Field of Classification Search
USPC ....................................................... 269/57
See application file for complete search history.

(56) References Cited

U.S. PATENT DOCUMENTS

| | | | | |
|---|---|---|---|---|
| 3,786,721 A | * | 1/1974 | Reda ................. | B23Q 1/28 408/71 |
| 6,457,383 B1 | * | 10/2002 | Kschier ............. | B23Q 1/28 409/220 |
| 2009/0256298 A1 | * | 10/2009 | Kitaura ............. | B23Q 16/102 269/57 |
| 2010/0175505 A1 | * | 7/2010 | Tatsuda ............. | B23Q 16/102 74/813 L |
| 2014/0035213 A1 | * | 2/2014 | Zheng ............... | B23Q 1/25 269/57 |
| 2015/0209928 A1 | * | 7/2015 | Tezuka ............. | B23Q 16/102 269/63 |

(Continued)

FOREIGN PATENT DOCUMENTS

| | | |
|---|---|---|
| JP | 4-63651 A | 2/1992 |
| JP | 4-63661 A | 2/1992 |

(Continued)

OTHER PUBLICATIONS

Notification of Reasons for Refusal dated Sep. 1, 2015, corresponding to Japanese Patent Application No. 2014-123675.

*Primary Examiner* — Alvin Grant
(74) *Attorney, Agent, or Firm* — Hauptman Ham, LLP

(57) ABSTRACT

A machine tool includes a clamping mechanism for clamping/unclamping rotation of a rotary table. A load is measured when an unclamping command is output and then the rotary table is rotated after a set time set in the timer passes, and the set time of the timer is changed in response to a magnitude of the measured load. In this way, it is possible to prevent the clamping mechanism from being damaged due to a subsequent command given before unclamping ends, and extend a life span of a component.

4 Claims, 4 Drawing Sheets

(56) References Cited

U.S. PATENT DOCUMENTS

2015/0251286 A1* 9/2015 Nishimura ............... B23Q 7/02
  279/4.04
2016/0008939 A1* 1/2016 Masuya ............. B23Q 11/0092
  29/64
2016/0207156 A1* 7/2016 Xia ..................... B23Q 16/105

FOREIGN PATENT DOCUMENTS

| JP | 2007-007735 A | 1/2007 |
| JP | 2010-017830 A | 1/2010 |

* cited by examiner

MACHINE TOOL HAVING A ROTARY TABLE

RELATED APPLICATIONS

The present application claims priority to Japanese Application Number 2014-123675, filed Jun. 16, 2014, the disclosure of which is hereby incorporated by reference herein in its entirety.

BACKGROUND OF THE INVENTION

1. Field of the Invention

The present invention relates to a machine tool such as a machining center, which includes a rotary table, and more particularly, to a machine tool having a function of automatically and optimally setting an unclamp timer in a clamping mechanism of a rotary table.

2. Description of the Related Art

A rotary table such as an index table has been widely used in a machine tool such as a machining center. In particular, in various types of dividing mechanisms (for example, a dividing mechanism using a servo motor of a turret tool post) for performing a dividing operation of a workpiece in the machine tool, a clamping mechanism has been used such that a location is fixed after a turning and dividing operation. In the clamping mechanism, not only a motor or control but also the clamping mechanism is an important factor to perform a highly reliable dividing operation. When another turning and dividing operation is performed again after performing a turning and dividing operation in the clamping mechanism, a turning operation is performed after the clamping mechanism is unclamped.

In general, the clamping mechanism in the rotary table is operated by air pressure or oil pressure. In the clamping mechanism, a subsequent command needs to be given after unclamping is completely performed. For this reason, there is a need to verify whether unclamping is completely performed or not. Whether unclamping is completed or not has been verified using a dedicated sensor, or an unclamping operation has been determined to be completed when a certain period of time passes after a command to perform unclamping is given.

Japanese Patent Application Laid-Open No. 2010-17830 discloses a technology related to a detector that detects a deterioration state of a clamp spring in a mechanism for fixing and releasing a tool by an urging force of the clamp spring with respect to a main spindle in a machine tool.

Japanese Patent Application Laid-Open No. 2007-7735 discloses a technology related to unclamping verification means for determining that a fixing member is in an unclamped state by detecting a position in a turning direction of a turning member by position detection means in a clamping mechanism of a machine tool.

When a conventional dedicated sensor for verification of unclamping is provided, or when an unclamping operation is verified using some kind of a sensor of the technologies disclosed in Japanese Patent Application Laid-Open Nos. 2010-17830 and 2007-7735, mentioned above, the unclamping operation may be reliably performed. However, there is a difficulty in adjusting a sensor, and a separate sensor needs to be provided, and thus there is concern about cost increase.

In a case in which an unclamping operation is determined to be completed when a certain period of time passes after a command to perform unclamping is given, a period of time from when a command to perform unclamping is given from a numerical controller or the like until unclamping is mechanically performed is presumed, and unclamping is regarded to be completed when the period of time passes. Then, a period of time (predetermined time) from when a command to perform unclamping is given until unclamping is completed is set in a timer, and the timer is configured to receive a subsequent command after waiting for the aforementioned predetermined time from the instant when the command to perform unclamping is given.

FIG. 4 illustrates timing charts showing an unclamping operation.

In FIG. 4, (a) illustrates an unclamping command which is turned ON at a time t1 and turned OFF at a time t3. A period of time from time t1 to time t3 is set by an unclamp timer. In addition, (c) illustrates that an interlock is configured to be locked between time t1 and time t3 during which the unclamp timer operates. (b) illustrates that a state of a mechanical clamp is changed from a clamped state to an unclamped state by receiving the unclamping command turned ON at time t1, and the change to the unclamped state is completed at a time t2.

Herein, a setting time (from time t1 to time t3) of the unclamp timer is set to be longer than an actual unclamping time (from time t1 to time t2) such that unclamping ends. For this reason, even when unclamping ends (at time t2) after the unclamping time passes, the interlock is in the locked state and thus another command may not be executed while the unclamp timer operates (that is, from time t1 to time t2). For this reason, a subsequent command is executed after the unclamp timer ends (that is, after time t3).

On the contrary, it may take a long time after the unclamping command is received until unclamping mechanically ends due to degradation over time of a component or degradation of grease in a piston part of a clamping mechanism when quality of air is poor or when the clamping mechanism operates by air pressure. In this instance, when it takes an excessively long time until unclamping ends, if original setting of the unclamp timer is unchanged, there is concern that a subsequent command is executed before the mechanical unclamping is completed. In addition, after the unclamping command is given, a rotation operation command is likely to be received. Thus, when a subsequent rotation operation command is started before an actual unclamping operation is completed, there is concern that the clamping mechanism is damaged and thus reliability of the clamping mechanism is degraded.

SUMMARY OF THE INVENTION

In this regard, the present invention has been conceived in view of the above-mentioned problems, and an object of the present invention is to provide a machine tool capable of extending a life span of a component by preventing damage of a clamping mechanism that clamps rotation of a rotary table included in the machine tool by adjusting setting of an unclamp timer.

A machine tool according to the present invention includes a rotary table for attaching a workpiece, a motor for driving the rotary table, a clamping mechanism for clamping rotation of the rotary table, and a timer for setting a time taken until a subsequent command is made available after an unclamping command for releasing a clamping operation of the clamping mechanism to a set time, and further includes a load measurement unit for measuring a load of an output shaft of the motor, a reference load storage unit for storing a reference load of the rotary table in advance, a provisional load storage unit for measuring and storing, as a provisional load, a load obtained when an unclamping command of the rotary table is output and the rotary table is rotated after the set time set in the timer passes, a load comparison unit for comparing the provisional load stored in the provisional load storage unit with the reference load stored in the reference load storage unit, and a timer changing unit for changing the set time of the timer when the provisional load exceeds the reference load as a result of comparison of the load comparison unit.

The reference load storage unit may measure a load obtained during rotation of the rotary table in a period at which an unclamped state is reliably obtained after the unclamping command is output and then a predetermined time passes, and store a maximum value of the measured load.

The provisional load storage unit may measure a load obtained during rotation of the rotary table in a period after the set time set in the timer passes, and store a maximum value of the measured load.

The load comparison unit may be configured to determine whether or not the provisional load falls within a predetermined ratio with respect to the reference load, and the timer changing unit may be configured to change the set time of the timer based on a result of the load comparison unit.

According to the present invention, it is to possible to provide a machine tool capable of extending a life span of a component by preventing damage of a clamping mechanism that clamps rotation of a rotary table included in the machine tool by adjusting setting of an unclamp timer.

BRIEF DESCRIPTION OF THE DRAWINGS

The above and other objects and features of the present invention will be apparent from the following description of embodiments with reference to accompanying drawings, in which.

DETAILED DESCRIPTION OF THE PREFERRED EMBODIMENTS

Figure 1:
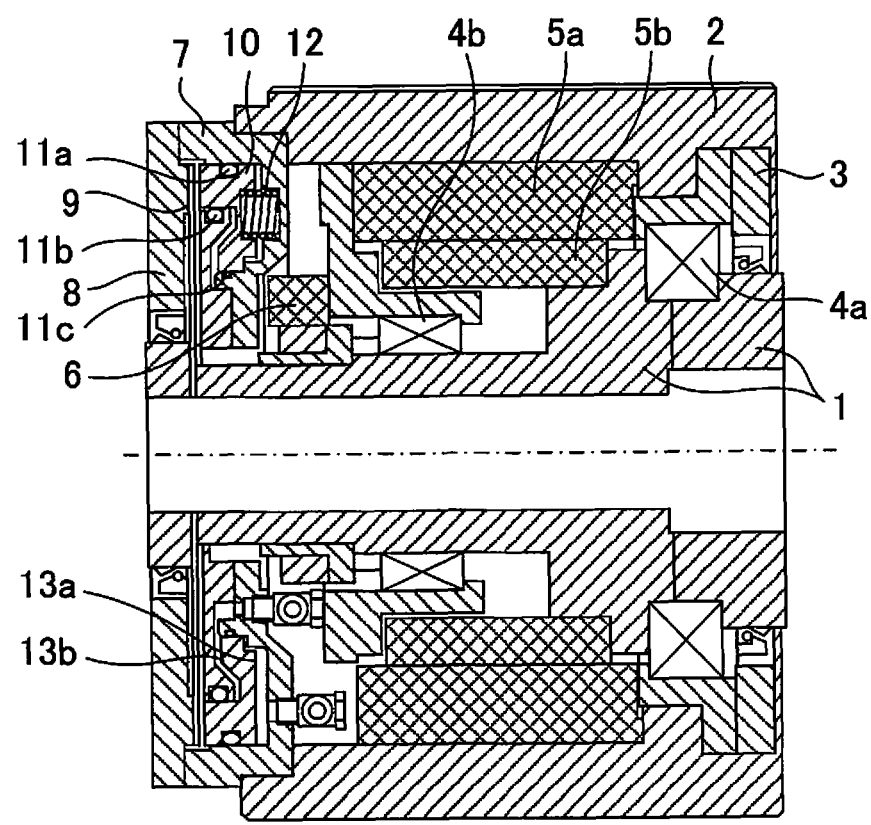
FIG. 1 is a cross-sectional view of an index table (rotary table) having a direct drive mechanism used for a machine tool according to the present invention.

A description will be given of an index table (rotary table) having a direct drive mechanism used for a machine tool according to the present invention using FIG. 1.

A housing 3 is fixed to a case 2. In the housing 3, a shaft 1 is rotatably supported through main bearings 4a and 4b. A stator 5a of a motor is fixed to the case 2. On the other hand, a rotor 5b of the motor is attached to a rotor holder, which is fixed to the shaft 1, and rotatably supported with respect to the case 2.

Further, an encoder 6, a cylinder 7 and a rear plate 8 are all fixed to the case 2. A brake disk 9 is coupled with the shaft 1 and rotatable with respect to the case 2. A piston 10 can operate forward and backward in the cylinder through seal materials 11a, 11b and 11c. All the seal materials 11a, 11b and 11c prevent chips or cutting fluid from entering from outside. In addition, the piston 10 is urged to operate in a direction in which clamping is performed by a spring 12.

When rotation of the rotary table is clamped, a flow passage of air is controlled by an electromagnetic valve such that compressed air flows into an air chamber 13a for clamping. When rotation of the rotary table is unclamped, the flow passage of air is controlled by the electromagnetic valve such that compressed air flows into an air chamber 13b for unclamping.

When a clamping command is input to the index table, compressed air flows into the air chamber 13a for clamping, and thus the piston 10 moves to a side of the brake disk 9, and the brake disk 9 is interposed between the piston 10 and the rear plate 8. As a result, the shaft 1 is put in a non-rotatable state. On the contrary, when an unclamping command is input to the index table, compressed air flows into the air chamber 13b for unclamping, and thus the piston 10 moves in an opposite direction with respect to the brake disk 9, and the brake disk 9 is released from the piston 10. As a result, the shaft 1 is put in a rotatable state.

It takes a predetermined time to complete the clamping and unclamping operations. It is possible to detect that unclamping is completed using a displacement sensor, a force sensor, and a flow sensor. In case where any of such mechanisms are not provided, a predetermined time that elapses after the unclamping command is given is set on the assumption that unclamping is completed when the set time elapses. Hereinafter, the set time that elapses after the unclamping command is given will be referred to as an "time period of unclamp timer", and a time that elapses until a mechanism is actually unclamped will be referred to as an "unclamping time".

A time period of the unclamp timer is a time that is set on the assumption that unclamping is completed. Thus, in the time period of the unclamp timer, another command is prevented from being executed by putting an interlock in a locked state. For this reason, a subsequent command is executed after the time period of the unclamp timer ends.

Incidentally, when the time period of the unclamp timer is set to be long, unclamping is reliably completed, and thus reliability may be maintained. However, it takes time to shift from the unclamping operation to a subsequent operation. On the contrary, when the time period of the unclamp timer is set to be short, an operation subsequent to the unclamping operation can be quickly executed. However, an actual unclamping time increases due to degradation over time or the like. When the actual unclamping time becomes longer than the time period of the unclamp timer, a subsequent operation is executed before unclamping is completed. Thus, there is concern that the brake disk 9 comes into contact with the piston 10 or the rear plate when the subsequent operation is executed.

For this reason, the time period of the unclamp timer needs to be appropriately set. Next, a description will be given of a method of optimizing the time period of the unclamp timer using a load detection function of the index table in the present embodiment.

When the shaft 1 is rotated in a state in which unclamping is mechanically completed, a load received by the motor corresponds to inertia of a workpiece or a jig fixed on the rotary table. However, when the shaft is rotated in a state in which unclamping is not mechanically completed, a load resulting from the brake disk 9 coming into contact with the piston 10 or the rear plate is detected in addition to the inertia. In the present embodiment, the time period of the unclamp timer is set by taking into consideration a fact that a load received by the motor increases in the state in which unclamping is not completed.

Figure 2A:
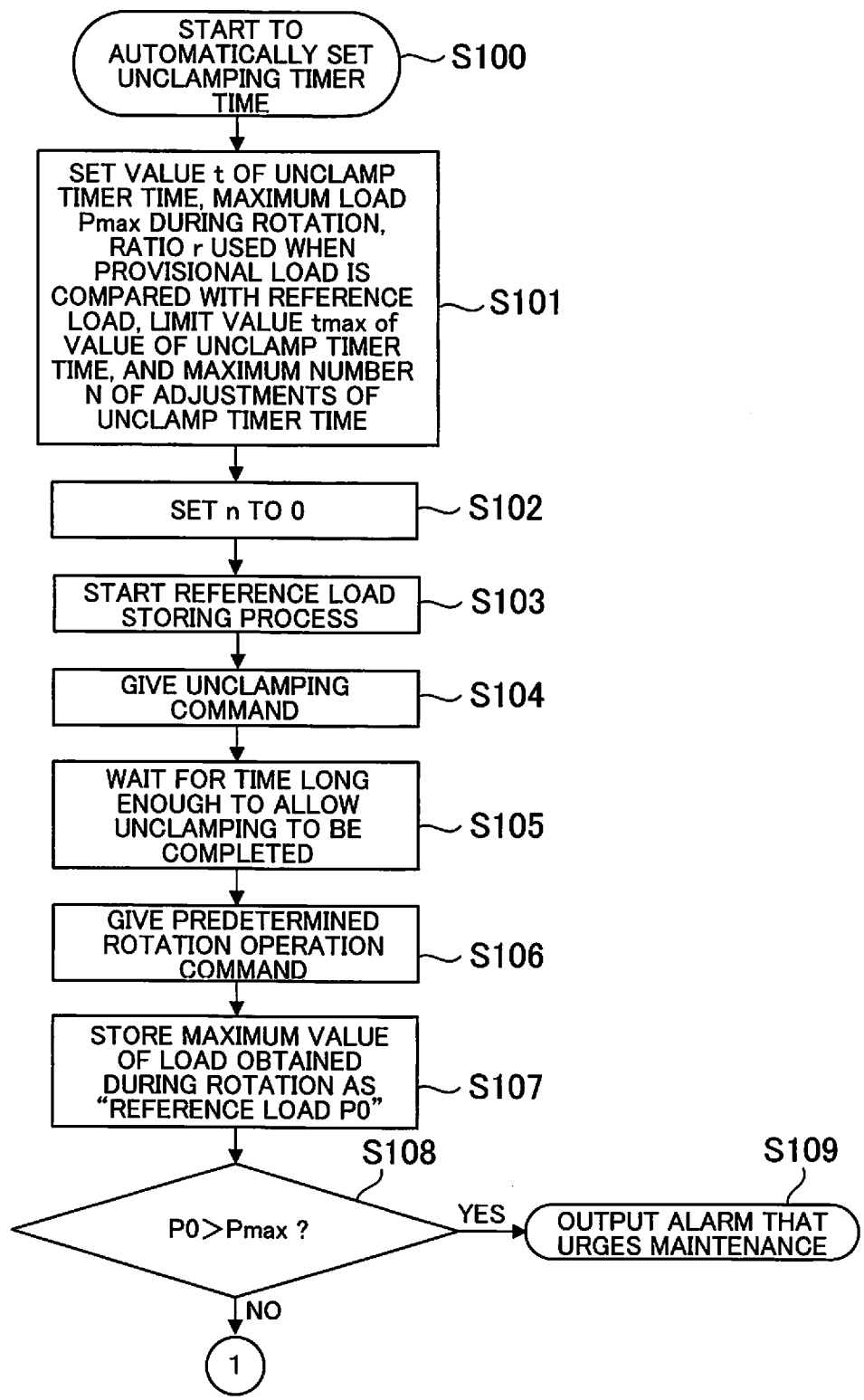
FIGS. 2A and 2B are flowcharts illustrating procedures of setting of an unclamp timer.
Figure 2B:
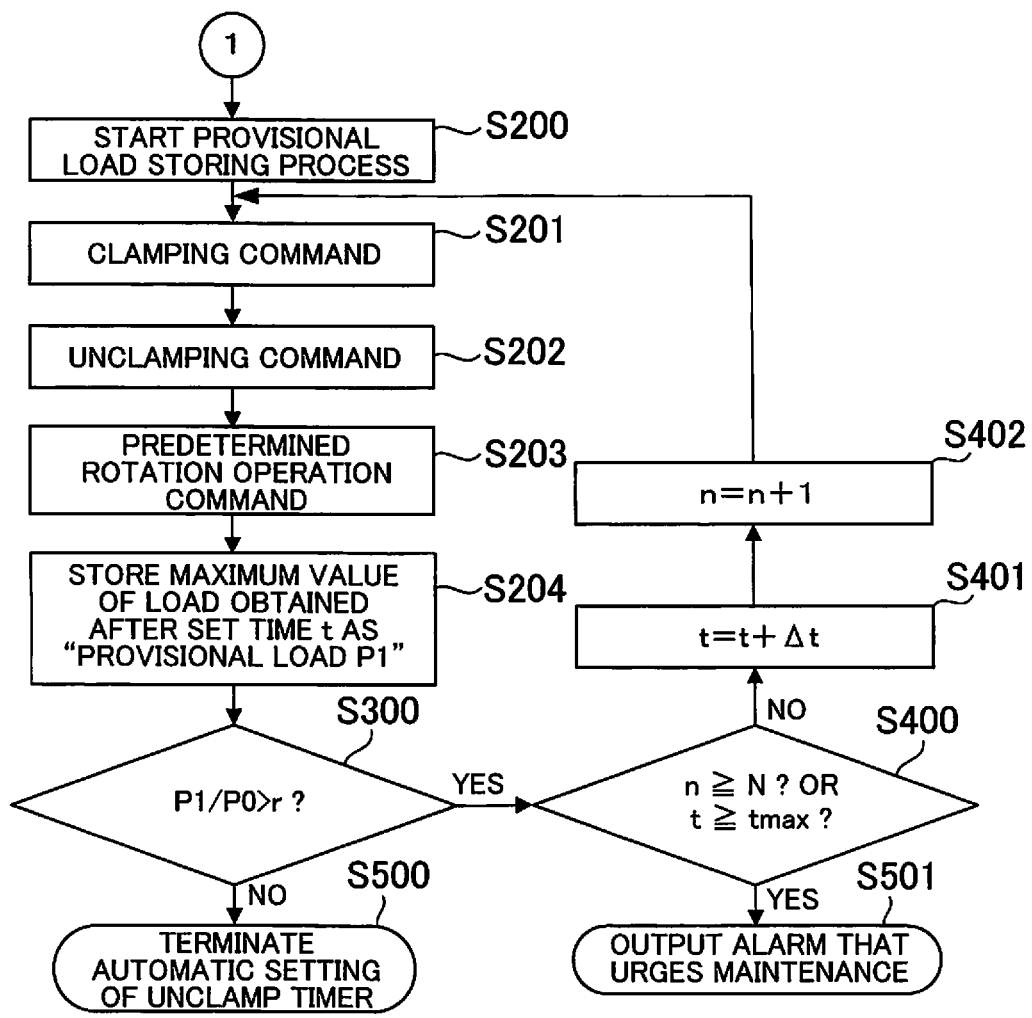
Figure 3:
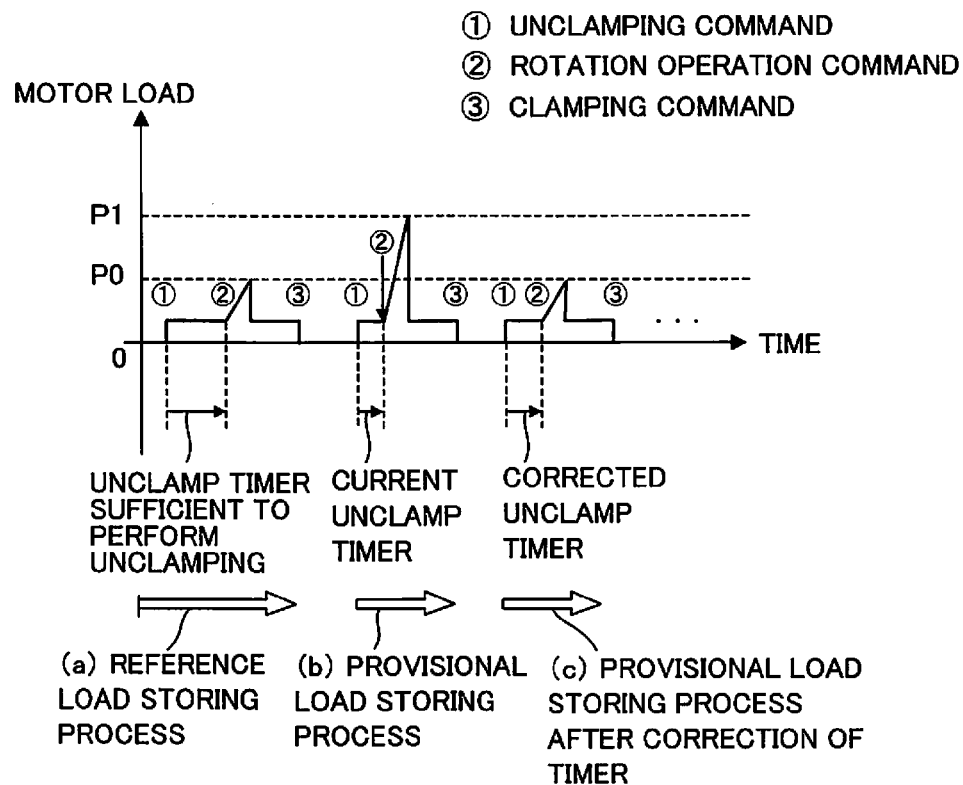
FIG. 3 is a timing chart in setting of the time of unclamping timer.
Figure 4:
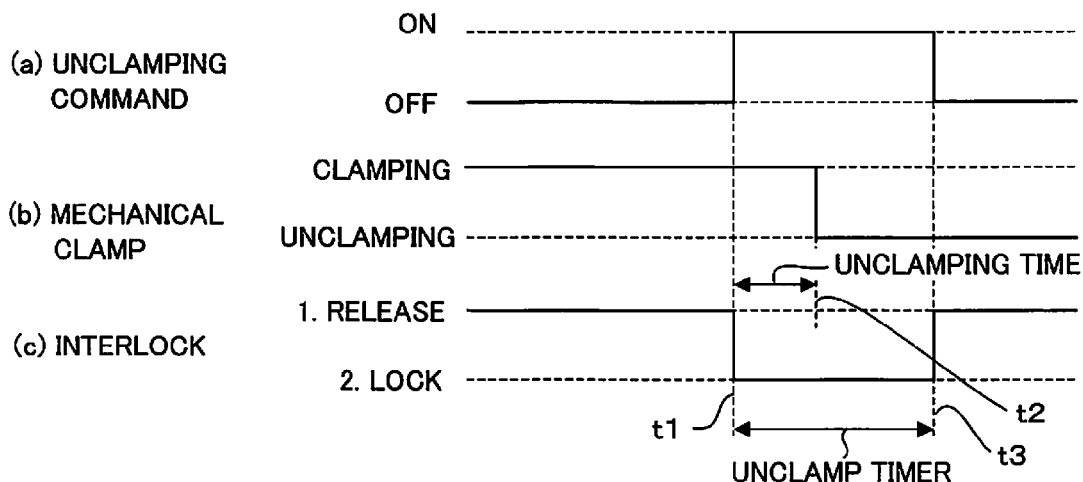
FIG. 4 illustrates timing charts showing an unclamping operation.

Next, a description will be given of a method of setting the time period of the unclamp timer in detail based on FIGS. 2A, 2B and 3. FIGS. 2A and 2B are flowcharts illustrating procedures of setting the time period of the unclamp timer, and FIG. 3 is a timing chart in setting of the time period of the unclamp timer. Hereinafter, the flowcharts of FIGS. 2A and 2B will be described for each step.

(Step S100) An optimization program for a time period of unclamping timer is initiated by an operator or the like to start an operation of automatically setting the unclamping timer.

(Step S101) A value t of the unclamp timer, a maximum load Pmax corresponding to a limit value of a load during rotation, a ratio r used when a provisional load is compared with a reference load, a maximum timer value tmax corresponding to a limit value of a value of the unclamp timer, and a maximum number N of adjustments of the time period of unclamp timer are set.

(Step S102) A value n is set to 0.

(Step S103) A process of storing the reference load is started (Process (a) of FIG. 3).

(Step S104) An unclamping command is given.

(Step S105) A time long enough to allow unclamping to be achieved without fault, which exceeds the value t of the unclamp timer, is waited.

(Step S106) A predetermined rotation operation command is given.

(Step S107) A maximum value of a load obtained during a rotation operation is stored as a reference load P0 in a memory.

(Step S108) Whether P0 exceeds Pmax or not is determined. The operation proceeds to step S109 when P0 exceeds Pmax (YES), and proceeds to step S200 when P0 does not exceed Pmax (NO).

(Step S109) Alarm that urges maintenance is output.

(Step S200) A process of storing a provisional load is started (see Process (b) of FIG. 3)

(Step S201) A clamping command is given.

(Step S202) An unclamping command is given after a predetermined time.

(Step S203) A predetermined rotation operation command is given with respect to a table.

(Step S204) A maximum value of a load obtained during the rotation operation after a set time t which is set in the unclamp timer passes is stored in the memory as a provisional load P1.

(Step S300) It is determined whether a value (P1/P0) obtained by dividing the provisional load P1 by the reference load P0 is greater than a predetermined value r or not. The operation proceeds to step S400 when the value (P1/P0) is greater than the predetermined value r (YES), and proceeds to step S500 to terminate automatic setting of the unclamp timer when the value (P1/P0) is not greater than the predetermined value r (NO).

(Step S400) It is determined whether or not n is greater than or equal to the maximum number N of adjustments, or whether or not t is greater than or equal to the limit value tmax of the value of the unclamp timer. The operation proceeds to step S501 when either is satisfied (YES), and proceeds to step S401 when neither is satisfied (NO).

(Step S401) The value t is updated by adding a predetermined value Δt to t.

(Step S402) The value n is updated by adding 1 to the value n.

(Step S501) An alarm that urges maintenance such as replacement of a clamping mechanism or the like is output.

FIG. 3 illustrates a timing chart of a function of automatically setting the unclamping time.

In FIG. 3:

Process (a) is a reference load storing process, in which the unclamping command is given, and then the rotation operation command is given after elapse of an unclamp timer time sufficient to perform unclamping, and a maximum value obtained during a rotation load operation is set to P0;

Process (b) is a provisional load storing process, in which a maximum value obtained during the rotation load operation after elapse of the unclamp timer time t is set to P1. In this case, unclamping does not end within the unclamp timer time t due to degradation over time or the like of a component. Thus, P1 is greater than the predetermined ratio r of P0. In this case, the unclamp timer time is corrected; and Process (c) is a provisional load storing process after correction of the unclamp timer time, in which the unclamp timer time is corrected to be longer when compared to a case of the provisional load storing process (b). In this way, unclamping ends within the unclamp timer time t, and thus the maximum value obtained during the rotation load operation becomes almost equal to a value of the reference load P0 stored in the reference load storing process. At this time, setting of the unclamp timer time is ended.

In the present embodiment, it is determined whether the provisional load P1 is greater than the predetermined ratio r of the reference load P0, and the unclamp timer time t is adjusted by increasing the unclamp timer time t by a predetermined time Δt when the provisional load P1 is greater than the predetermined ratio r of the reference load P0. However, depending on lengths of the predetermined time Δt, a value of the unclamp timer time t may be increased more than necessary. For this reason, after the unclamp timer time t is adjusted by being increased in stages, a predetermined changed time may be set to a small value, and the unclamp timer time t may be adjusted to an optimum unclamp timer time by being decreased in stages.

In addition, although the present embodiment has been described using the index table installed in the machine tool as the rotary table, the present embodiment may be similarly applied to a cradle-type index table supported from an opposite side of the table.

The invention claimed is:

1. A machine tool comprising:
   a rotary table for attaching a workpiece;
   a motor for driving the rotary table;
   a clamping mechanism for clamping rotation of the rotary table; and
   a timer for setting a time taken until a subsequent command is made available after an unclamping command for releasing a clamping operation of the clamping mechanism to a set time,
   wherein the machine tool includes
   a load measurement unit for measuring a load of an output shaft of the motor,
   a reference load storage unit for storing a reference load of the rotary table in advance,
   a provisional load storage unit for measuring and storing, as a provisional load, a load obtained when an unclamping command of the rotary table is output and the rotary table is rotated after the set time set in the timer passes,
   a load comparison unit for comparing the provisional load stored in the provisional load storage unit with the reference load stored in the reference load storage unit, and a timer changing unit for changing the set time of the timer when the provisional load exceeds the reference load as a result of comparison of the load comparison unit.

2. The machine tool according to claim 1, wherein the reference load storage unit measures a load obtained during rotation of the rotary table in a period at which an unclamped state is reliably obtained after the unclamping command is output and then a predetermined time passes, and stores a maximum value of the measured load.

3. The machine tool according to claim 1, wherein the provisional load storage unit measures a load obtained during rotation of the rotary table in a period after the set time set in the timer passes, and stores a maximum value of the measured load.

4. The machine tool according to claim 1,
wherein the load comparison unit is configured to determine whether or not the provisional load falls within a predetermined ratio with respect to the reference load, and
the timer changing unit is configured to change the set time of the timer based on a result of the load comparison unit.

\* \* \* \* \*